United States Patent
Takayanagi et al.

(10) Patent No.: US 7,980,711 B2
(45) Date of Patent: Jul. 19, 2011

(54) LIGHT-EMITTING DISPLAY DEVICE-EQUIPPED REAR-VIEW MIRROR

(75) Inventors: Shinya Takayanagi, Fujieda (JP); Masatoshi Nakamura, Fujieda (JP)

(73) Assignee: Murakami Corporation, Shizuoka (JP)

( * ) Notice: Subject to any disclaimer, the term of this patent is extended or adjusted under 35 U.S.C. 154(b) by 216 days.

(21) Appl. No.: 12/362,678

(22) Filed: Jan. 30, 2009

(65) Prior Publication Data
US 2009/0244740 A1    Oct. 1, 2009

(30) Foreign Application Priority Data
Mar. 31, 2008    (JP) .................. 2008-090323

(51) Int. Cl.
*G02B 5/08*    (2006.01)
*G02F 1/153*    (2006.01)

(52) U.S. Cl. ........................ 359/839; 359/267
(58) Field of Classification Search .......... None
See application file for complete search history.

(56) References Cited

U.S. PATENT DOCUMENTS

| | | | |
|---|---|---|---|
| 7,042,616 B2 * | 5/2006 | Tonar et al. ............ | 359/265 |
| 2007/0053085 A1 | 3/2007 | Shih | |
| 2009/0040778 A1 | 2/2009 | Takayanagi et al. | |

FOREIGN PATENT DOCUMENTS

| | | |
|---|---|---|
| JP | 2000-153736 | 6/2000 |
| JP | 2000-255321 | 9/2000 |
| JP | 2002-67806 | 3/2002 |

OTHER PUBLICATIONS

English language Abstract of JP 2000-153736, Jun. 6, 2000.
English language Abstract of JP 2000-255321, Sep. 19, 2000.
U.S. Appl. No. 12/138,538 to Nakamura et al., which was filed on Jun. 13, 2008.
U.S. Appl. No. 12/194,716 to Takayanagi et al, which was filed on Aug. 20, 2008.

* cited by examiner

*Primary Examiner* — Stephone B Allen
*Assistant Examiner* — Jade R Chwasz
(74) *Attorney, Agent, or Firm* — Greenblum & Bernstein P.L.C.

(57) ABSTRACT

Interference of light is prevented from occurring in a rear-view mirror incorporating a light-emitting display device where a dark color mask member is arranged behind a mirror element. A mirror element is formed by forming a semi-transmissive reflective film on one surface of a transparent substrate. On a back surface of the mirror element, a dark color mask member is arranged. An opening a is formed in the dark color mask member Behind the mirror element, a light-emitting display device is arranged facing the opening. A protrusion forming a spacer is formed on the entire peripheral edge of a front surface of the dark color mask member. The spacer provides a clearance gap between the semi-transmissive reflective film and the dark color mask member.

7 Claims, 7 Drawing Sheets

(FRONT SIDE)

(A) REAR-VIEW MIRROR WITH COATING FILM (B) REAR-VIEW MIRROR IN FIGS. 1(A) AND 1(B)

(A) WHERE FRONT SURFACE IS ROUGH (B) WHERE FRONT SURFACE IS SMOOTH (A) NO SPACER PROVIDED (B) SPACER PROVIDED

LIGHT-EMITTING DISPLAY DEVICE-EQUIPPED REAR-VIEW MIRROR

The disclosure of Japanese Patent Application No. JP2008-90323 filed on Mar. 31, 2008 including the specification, drawing and abstract is incorporated herein by reference in its entirety.

BACKGROUND OF THE INVENTION

1. Field of the Invention

The present invention relates to a rear-view mirror incorporating a light-emitting display device, which prevents interference of light from occurring where a dark color mask member is arranged behind a mirror element.

2. Description of the Related Art

Japanese Patent Laid-Open Nos. 2000-153736 and 2000-255321 each discloses a rear-view mirror incorporating a light-emitting display device to display information.

The rear-view mirror disclosed in Japanese Patent Laid-Open No. 2000-153736 is formed by: forming a semi-transmissive reflective film formed of a dielectric multilayer film on the back surface of a mirror substrate; forming a colored paint film on the region excluding a part of the entire region of the back surface of the semi-transmissive reflective film; forming a transparent paint film or a semi-transparent paint film on the region of the back surface of the semi-transmissive reflective film where the colored paint film is not formed; and arranging a monitor device on the back side of the region of the mirror substrate where the transparent paint film or the semi-transparent paint film is formed. The colors of the colored paint film and the screen of the monitor device are set so that when the monitor device is off, the colored paint film and the screen of the monitor device have colors that are substantially the same (black). Consequently, when the monitor device is off, the boundary between the colored paint film and the screen of the monitor device is unclear, preventing the mirror visibility from being lowered by the boundary.

The rear-view mirror disclosed in Japanese Patent Laid-Open No. 2000-255321 is formed by: forming a semi-transmissive reflective film formed of a dielectric multilayer film on the back surface of a mirror substrate, arranging a colored plate in a region excluding a part of the entire region of the back side of the semi-transmissive reflective film, in contact with the semi-transmissive reflective film, and arranging a monitor device on the region of the back surface of the semi-transmissive reflective film where the colored plate is not arranged. The colors of the colored plate and the screen of the monitor device are set so that when the monitor device is off, the colored plate and the screen of the monitor device have colors that are substantially the same (black). Consequently, when the monitor device is off, the boundary between the colored plate and the screen of the monitor device is unclear, preventing the mirror visibility from being lowered by the boundary.

According to the rear-view mirror disclosed in Japanese Patent Laid-Open No. 2000-153736, when a paint film is formed on the back surface of the semi-transmissive reflective film, reflection on the back surface of the semi-transmissive reflective film is weakened (i.e., loss of light is large). Therefore, in order to provide a reflectance necessary for a rear-view mirror, it is necessary that the semi-transmissive reflective film itself have a high reflectance, which results in the transmittance lowering in turn, lowering the visibility of indications when the monitor device is on. According to the rear-view mirror disclosed in Japanese Patent Laid-Open No. 2000-255321, as opposed to the case where a paint film is formed on the back surface of the semi-transmissive reflective film, strong reflection on the back surface of the semi-transmissive reflective film can be obtained (i.e., loss of light is small), and accordingly, both a reflectance sufficient for functioning as a rear-view mirror and good visibility of indications when the monitor device is on can be provided. However, there is a problem in that interference of light easily occurs in the portion where the contact between the mirror substrate and the colored plate is uneven (for example, the contact between the mirror substrate and the colored plate becomes uneven when an external force is applied to the mirror substrate or when the mirror substrate or the colored plate is strained), resulting in a poor design and deteriorating the mirror visibility.

The present invention has been made in view of the aforementioned points, and aims to provide a light-emitting display device-equipped rear-view mirror that prevents interference of light from occurring when a dark color mask member is arranged behind a mirror element.

SUMMARY OF THE INVENTION

The present invention comprises: a mirror element having a semi-transmissive reflective film on one surface of a transparent substrate; a dark color mask member having an opening in a surface thereof, the mask member being arranged facing an entire region excluding a region facing the opening or a relevant region excluding the region facing the opening, of a back surface of the mirror element, at least a front surface of the mask member being of a dark color; and a spacer arranged between the transparent substrate and the dark color mask member and providing a clearance gap between the transparent substrate and the dark color mask member; and a light-emitting display device arranged at a position behind the mirror element, with a display surface facing the opening of the dark color mask member, wherein a distance provided by the clearance gap between the transparent substrate and the dark color mask member is set to a distance that prevents interference of light from occurring between light reflected by the back surface of the mirror element and light reflected by the front surface of the dark color mask member. According to the present invention, a spacer is arranged between a transparent substrate and a dark color mask member to form a clearance gap providing a distance that prevents interference of light from occurring between the transparent substrate and the dark color mask member, and as a result, interference of light is prevented, enabling provision of an improved design and mirror visibility.

The distance provided by the clearance gap can be set to, for example, no less than 0.3 mm and no more than 5 mm. The spacer can be formed of, for example, a protrusion protruding from a peripheral edge of a surface of the dark color mask member facing the mirror element. Alternatively, the spacer can be formed as a body separated from the dark color mask member. It is desirable that the front surface of the dark color mask member facing the mirror element be smooth, and an arithmetic average roughness Ra of the front surface can be, for example, no more than 0.6 μm. As a result of smoothing the front surface of the dark color mask member, light scattering on the surface of the dark color mask member is suppressed, enabling provision of a more favorable design and mirror visibility. The semi-transmissive reflective film can be formed of, for example, a dielectric multilayer film. A reflection peak wavelength in a visible light range of the mirror element can be set to, for example, from 430 nm to 630 nm, preferably, from 500 nm to 550 nm.

DETAILED DESCRIPTION OF THE PREFERRED EMBODIMENTS

Embodiment 1

Figure 1A:
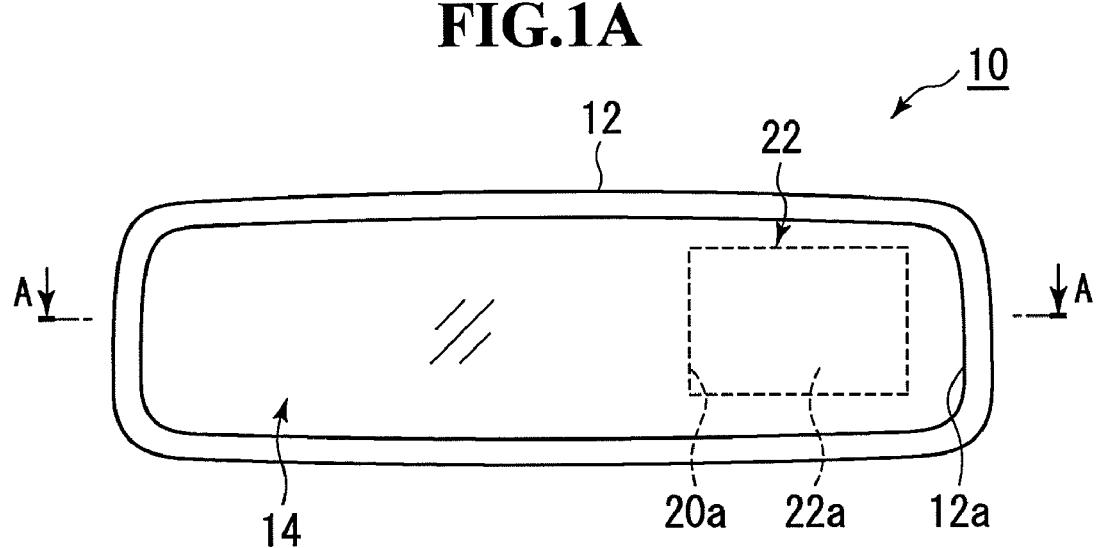
FIGS. 1A and 1B are a front view and a cross-sectional view of a rear-view mirror according to embodiment 1 of the present invention.
Figure 1B:
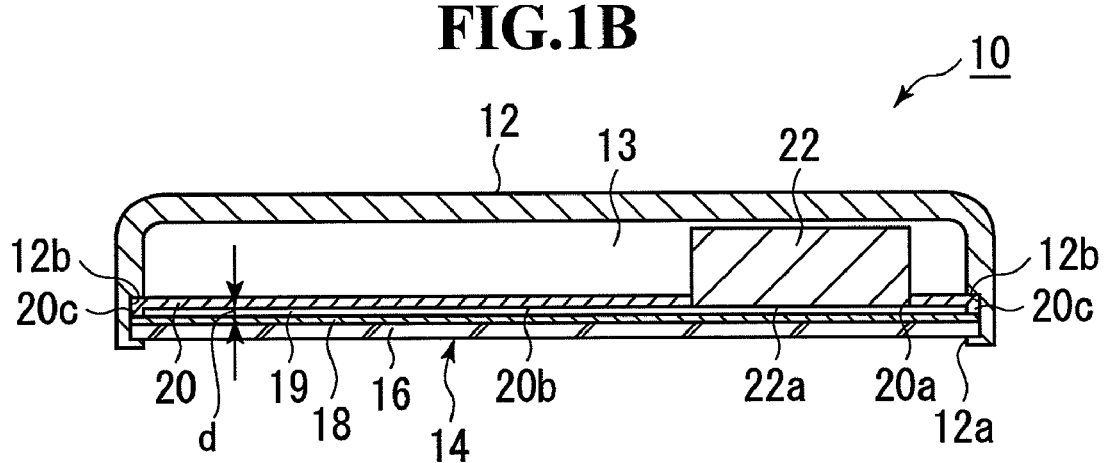

Embodiment 1 of the present invention will be described. FIG. 1 illustrates an overview of the inner structure of a vehicle inner mirror to which the present invention has been applied. FIG. 1A is a front view, and FIG. 1B is a cross-sectional view taken along a line indicated by arrows A-A in FIG. 1 A. An inner mirror 10 is formed by putting a mirror element 14 into a front surface opening 12a of a housing 12. The mirror element 14 is formed as a back-surface mirror having a semi-transmissive reflective film 18, which is formed of a dielectric multilayer film, on the entire back surface of a transparent substrate 16, which is formed of, e.g., transparent glass or transparent optical resin. On the back side of the mirror element 14, a dark color (for example, black) mask member 20 is arranged facing the back side of the mirror element 14 across a clearance gap 19 providing a predetermined distance d between the mirror element 14 and the dark color mask member 20. An opening 20a is formed at the relevant region of the dark color mask member 20 (in FIGS. 1A and 1B, the right corner of the surface of the mirror element 14 close to a driver's viewpoint). The dark color mask member 20 is arranged facing the entire back surface of the mirror element 14 excluding the position of the opening 20a. In a space 13 in the housing 12, a light-emitting display device 22 is arranged at a position behind the mirror element 14, with a display surface 22a facing the opening 20a of the dark color mask member 20. The distance provided by the clearance gap 19 at any position where the light-emitting display device 22 and the mirror element 14 face each other is set to the distance d provided by the clearance gap at the position where the dark color mask member 20 and the mirror element 14 face each other or larger. In other words, the light-emitting display device 22 does not protrude forward from the front surface 20b of the dark color mask member 20. The light-emitting display device 22 may be, e.g., a liquid-crystal display device or an EL display device. The color of the display surface 22a of the light-emitting display device 22 is set so that it is substantially the same as that of the front surface 20b of the dark color mask member 20 (for example, black) when the light-emitting display device 22 is off. The light-emitting display device 22 is supported by being attached to the dark color mask member 20 or supported by being attached to a relevant part of the inside of the housing 12.

The dark color mask member 20 can be formed of a dark color resin made of, e.g., PP (polypropylene), PVC (polyvinyl chloride), ASA (acrylonitrile styrene acrylic rubber), PS (polystyrene) or ABS (acrylonitrile butadiene styrene) or a resin with at least its front surface provided with dark color coating, or can also be formed of, e.g., a plate of metal, e.g., Al or Fe provided with dark color coating, and in all the cases, a material which has the color tone closest to that of the display surface 22a when the light-emitting display device 22 is off is preferable. Also, from the viewpoint of lightweight, resin materials are more preferable than metal materials.

Figure 2A:
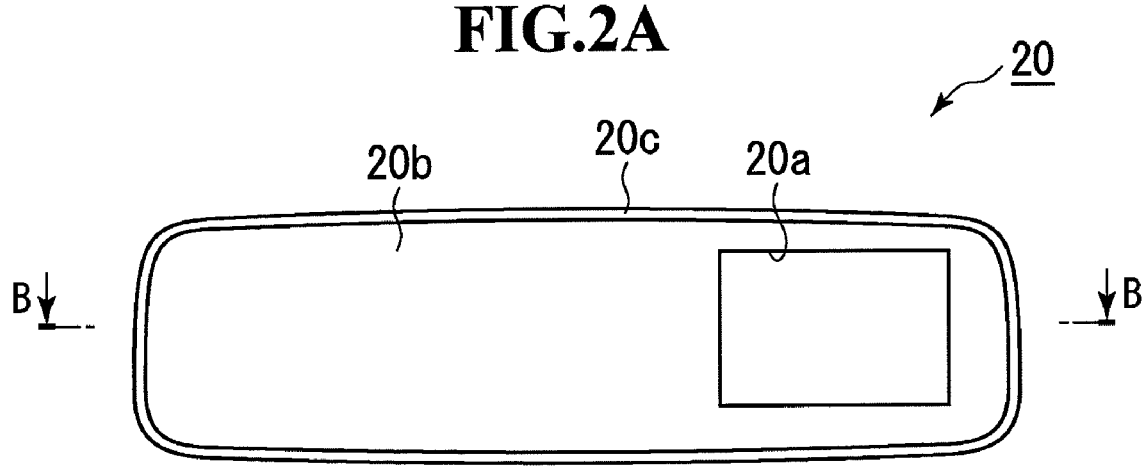
FIGS. 2A and 2B are a front view and a cross-sectional view of a structure of a dark color mask member 20 shown in FIGS. 1A and 1B.
Figure 2B:
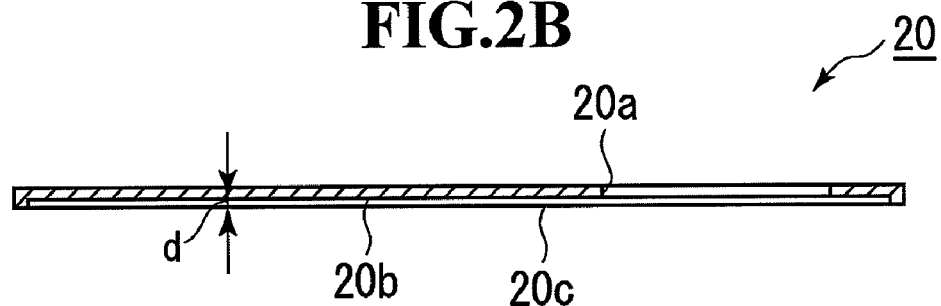

FIGS. 2A and 2B illustrate the structure of the dark color mask member 20. FIG. 2A is a front view, and FIG. 2B is a cross-sectional view taken along a line indicated by arrows B-B in FIG. 2A. The entire of the dark color mask member 20 is integrally formed of, e.g., a dark color resin plate. The front shape of the dark color mask member 20 has the same outer shape as that of the mirror element 14, and a protrusion 20c forming a spacer is integrated with the entire peripheral edge of the front surface (the surface facing the mirror element 14) 20b of the dark color mask member 20. The spacer 20c has a rectangular shape in cross section, and the height d of the spacer is set to be equal to the distance d provided by a clearance gap 19 between the mirror element 14 and the dark color mask member 20, which is provided by the spacer 20c. In the surface surrounded by the spacer 20c of the dark color mask member 20, the opening 20a is formed.

As illustrated in FIG. 1B, a groove 12b is formed around the entire circumference of the inner wall surface of the opening 12a of the housing 12, and the mirror element 14 and the dark color mask member 20 are put together and put into the groove 12b. At this time, the mirror element 14 enters a state in which the entire peripheral edge of its back surface is in contact with the top surface of the spacer 20c. As a result, the mirror element 14 and the dark color mask member 20 are kept facing each other across the distance d provided by the clearance gap 19 therebetween. The distance d provided by the clearance gap 19 is a distance that prevents interference of light from occurring between light reflected by the back surface of the mirror element 14 and light reflected by the front surface of the dark color mask member 20, and is preferably no less than 0.3 mm, for example. Furthermore, if the distance d provided by the clearance gap 19 is overly large, the thickness of the housing 12 will increase, and accordingly, it is desirable that the distance d is no more than 5 mm.

Figure 3:
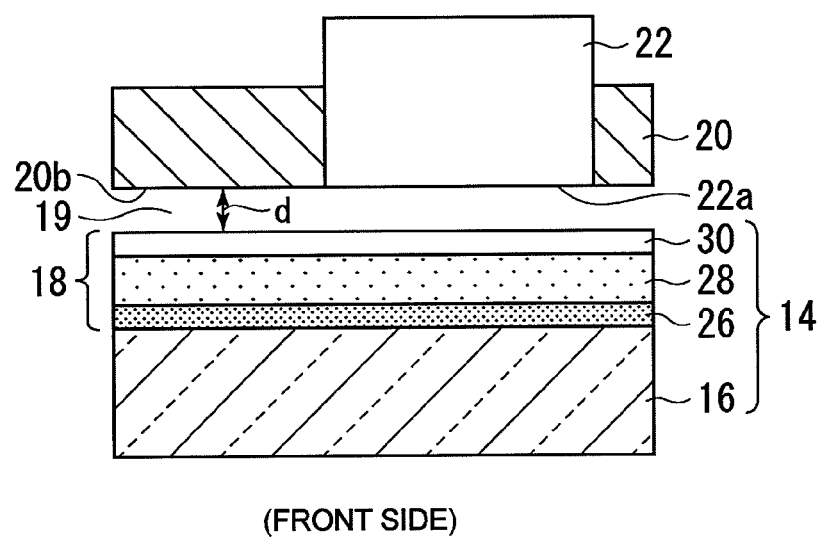
FIG. 3 is a cross-sectional view schematically illustrating a film configuration of a semi-transmissive reflective film 18 shown in FIGS. 1A and 1B.

FIG. 3 schematically illustrates the film configuration of the semi-transmissive reflective film 18. The transparent substrate 16 is formed of, for example, soda lime glass. On the back surface of the transparent substrate 16, the semi-transmissive reflective film 18 is formed. The semi-transmissive reflective film 18 formed of a dielectric multilayer film obtained by sequentially depositing three films, i.e., a high refractive index material film 26, a low refractive index material film 28 and a high refractive index material film 30, is formed on the back surface of the transparent substrate 16. Each of the films 26, 28 and 30 is formed of a material that absorbs no visible light or absorbs an extremely small amount of visible light. The high refractive index material films 26 and 30 can be formed of, for example, $TiO_2$, $Ta_2O_5$, $ZrO_2$, $Nb_2O_5$, etc. The low refractive index material film 28 is formed of, for example, $SiO_2$, $Al_2O_3$, $MgF_2$, etc. The optical film thickness of each of the films 26, and 30 is λ/4 (λ=430 nm to 630 nm, preferably, 500 nm to 550 nm), and the reflection peak wavelength in the visible light range of the mirror element 14 is set to from 430 nm to 630 nm, preferably, from 500 to 550 nm.

Figure 4:
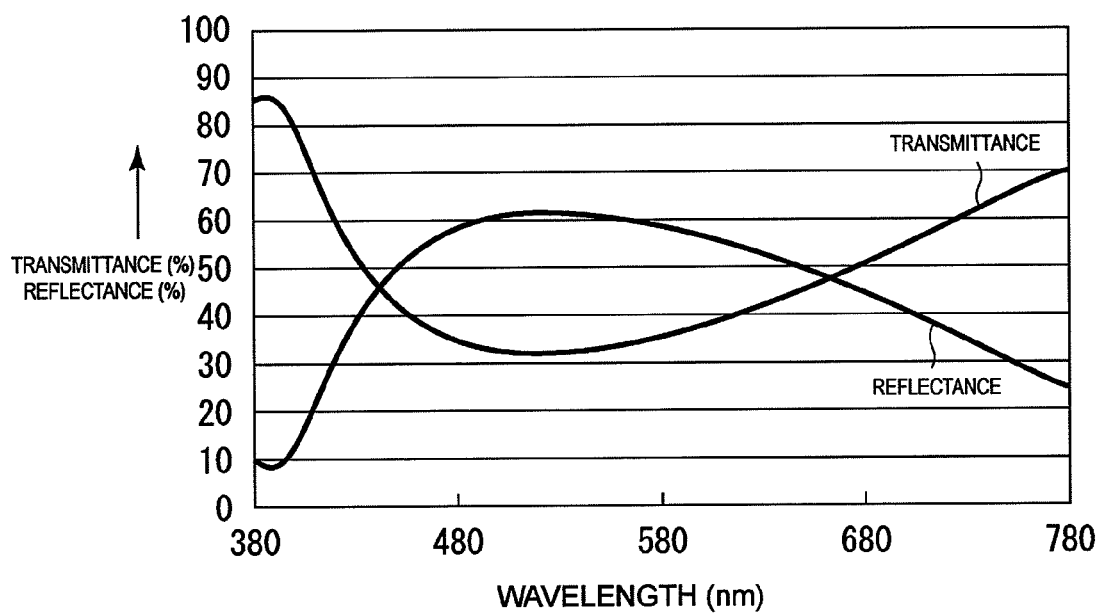
FIG. 4 is a graph indicating an example of the reflectance characteristics and the transmittance characteristics of a mirror element shown in FIG. 3.

FIG. 4 shows an example of the reflectance characteristics and the transmittance characteristics of the mirror element 14 shown in FIG. 3 where the high refractive index material films 26 and 30 are each formed of $TiO_2$ and the low refractive index material film 28 is formed of $SiO_2$. The characteristics exhibit a single reflection peak in the visible light range. According to the characteristics, the reflectance necessary for a vehicle mirror can be obtained. Also, the reflection peak wavelength in the visible light range is approximately 530 nm, and the reflectance for that wavelength is approximately 60%. Accordingly, glare that a cold mirror may give will not be given to drivers. Also, since the reflectance gently decreases at both sides of the reflection peak wavelength, it is possible to reduce the reflected light intensity for both bluish short-wavelength range light from a discharge lamp and reddish long wavelength range light from a halogen lamp, making it possible to obtain a higher glare prevention effect. Also, where the high refractive index material films of the semi-transmissive reflective film 18 are formed of $TiO_2$ and the low refractive index material film is formed of $SiO_2$, the integrating sphere visible reflectance becomes overly high if five or more layers are deposited, resulting in that headlight from behind makes a driver have the feeling of glare at night. Furthermore, as the number of layers increases, the spectral shape of the reflected light sharply changes, and as a result, problems arise, for example, in that the mirror element 14 provides no natural tone and becomes unsuitable for a mirror, and moreover, and that its view angle dependency increases, causing a discontinuous part in the tone of reflected light. Therefore, three or four layers are suitable for the laminated layers of the semi-transmissive reflective film 18.

Figure 5A:
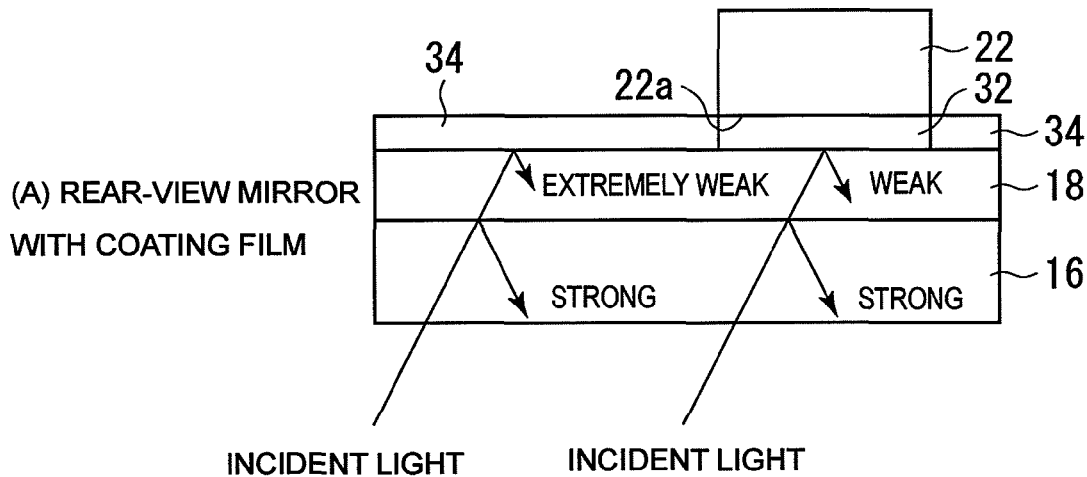
FIGS. 5A and 5B are diagrams schematically indicating differences in light reflection strength between the case where a colored paint film and a transparent paint film or a semi-transparent paint film are formed on a back surface of mirror substrate like the rear-view mirror disclosed in Japanese Patent Laid-Open No. 2000-153736 and the case where a dark color mask member 20 is arranged on a back surface of mirror substrate like the rear-view mirror shown in FIG. 1.

Here, differences in reflectance between the case where a colored paint film and a transparent paint film or a semi-transparent paint film are formed on the back surface of a mirror substrate like the rear-view mirror disclosed in Japanese Patent Laid-Open No. 2000-153736 and the case where a dark color mask member 20 is arranged like the rear-view mirror in FIG. 1 (both the colored paint film and the dark color mask member 20 are black) will be described. FIG. 5A schematically illustrates light reflection by the rear-view mirror according to Japanese Patent Laid-Open No. 2000-153736 (the same reference numerals are provided to the parts that are in common with those in FIG. 1). A semi-transmissive reflective film 18 is formed on the back surface of a transparent substrate 16. A transparent paint film or a semi-transparent paint film 32 is formed at the region of the back surface of the semi-transmissive reflective film 18 where a light-emitting display device 22 is arranged, and a black colored paint film 34 is formed at the remaining region. The transparent substrate 16 is formed of soda lime glass, and the semi-transmissive reflective film 18 is formed of a dielectric multilayer film formed of three layers of $Ta_2O_5$ (high refractive index material film)—$Al_2O_3$ (low refractive index material film)—$TiO_2$ (high refractive index material film). The integrating sphere visible reflectances in this case are:

46% when nothing is formed on the back surface of the semi-transmissive reflective film 18;

34% at the region where a transparent acrylic paint film is formed on the back surface of the semi-transmissive reflective film 18 as the transparent paint film 32; and 31% at the region where a black acrylic paint film is formed on the back surface of the semi-transmissive reflective film 18 as the colored paint film 34. In other words, when nothing is formed on the back surface of the semi-transmissive reflective film 18, a reflectance sufficient for functioning as a rear-view mirror can be obtained because reflection on the front surface of the semi-transmissive reflective film 18 and reflection on the back surface thereof contribute to the reflectance of the whole mirror element. Meanwhile, when the transparent paint film or semi-transparent paint film 32, or the colored paint film 34 is formed on the back surface of the semi-transmissive reflective film 18, no reflectance sufficient for functioning as a rear-view mirror can be obtained because although strong reflection occurs on the front surface of the semi-transmissive reflective film 18, which contributes to the reflectance of the whole mirror element, the reflection on the back surface thereof is weakened, which makes almost no contribution to the reflectance of the whole mirror element. Furthermore, the reflectance of the region where the colored paint film 34 is formed is lower by around 3% compared to the region where the transparent paint film 32 is formed (lowering of the reflectance is remarkable when a reflective film is formed of a dielectric multilayer film). Accordingly, when the light-emitting display device 22 is off, a difference in color tone (unnatural shading) occurs between light reflected by the region where the colored paint film 34 is formed and light reflected by the region where the transparent paint film 32 is formed, and as a result, the two regions can easily be distinguished visually, resulting in a poor design.

Figure 5B:
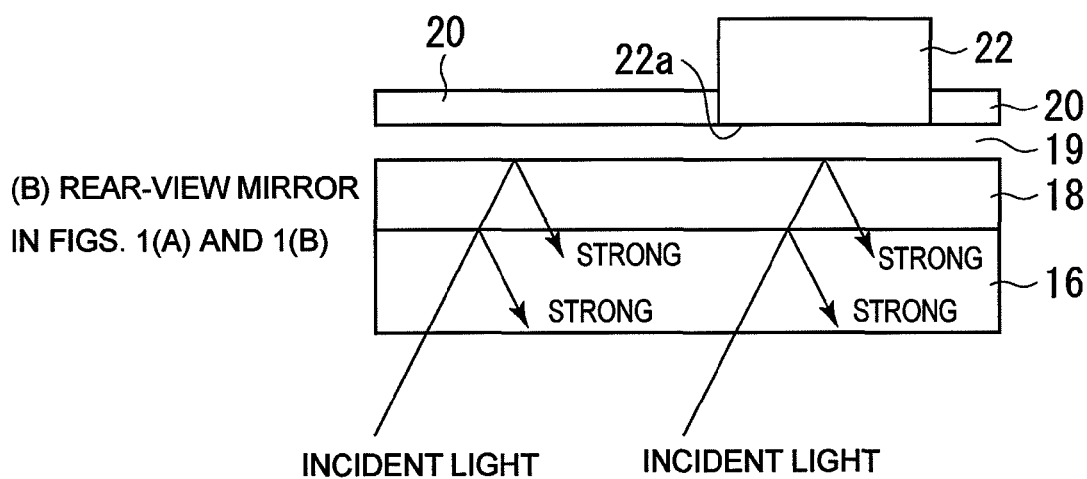

FIG. 5B schematically illustrates light reflection by the rear-view mirror in FIG. 1. As in the case of FIG. 5A, the transparent substrate 16 is formed of soda lime glass, and the semi-transmissive reflective film 18 is formed of a dielectric multilayer film having three layers of $Ta_2O_5$ (high refractive index material film)—$Al_2O_3$ (low refractive index material film)—$TiO_2$ (high refractive index material film). The integrating sphere visible reflectances in this case are:

46% when nothing is formed on the back surface of the semi-transmissive reflective film 18;

47% at the region where a black dark color mask member 20 (whose front surface has an arithmetic average roughness Ra of no more than 0.6 μm) is arranged on the back surface of the semi-transmissive reflective film 18; and 46% at the region where a light-emitting display device 22 (the color of the display surface 22a is black during the light-emitting display device 22 being off) is arranged on the back surface of the semi-transmissive reflective film 18.

In other words, since the clearance gap 19 is formed on the back surface of the semi-transmissive reflective film 18, strong reflection on the front surface of the semi-transmissive reflective film 18 and the back surface thereof can be obtained at both of the regions where the dark color mask member 20 is arranged and where the light-emitting display device 22 is arranged, and both of the reflected light contribute to the reflectance of the whole mirror element, and accordingly a reflectance sufficient for functioning as a rear-view mirror can be obtained. Furthermore, since the difference in reflectance between the region where the dark color mask member 20 is arranged and the region where the light-emitting display device 22 is arranged is small, the difference in color tone between light reflected by the region where the dark color mask member 20 is arranged and light reflected by the region where the light-emitting display device 22 is arranged is small when the light-emitting display device 22 is off, and as a result, the two regions cannot easily be distinguished, providing a good design.

Figure 6A:
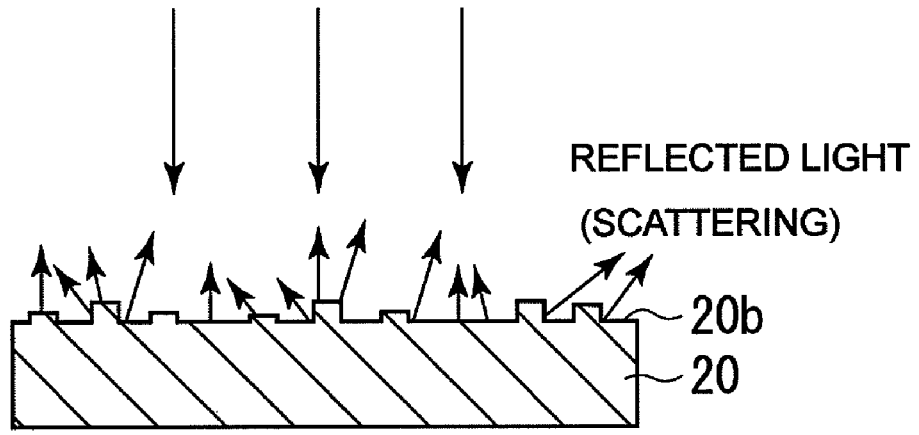
FIGS. 6A and 6B are diagrams indicating differences in light reflection on a front surface of a dark color mask member between where the front surface is rough and where the front surface is smooth.
Figure 6B:
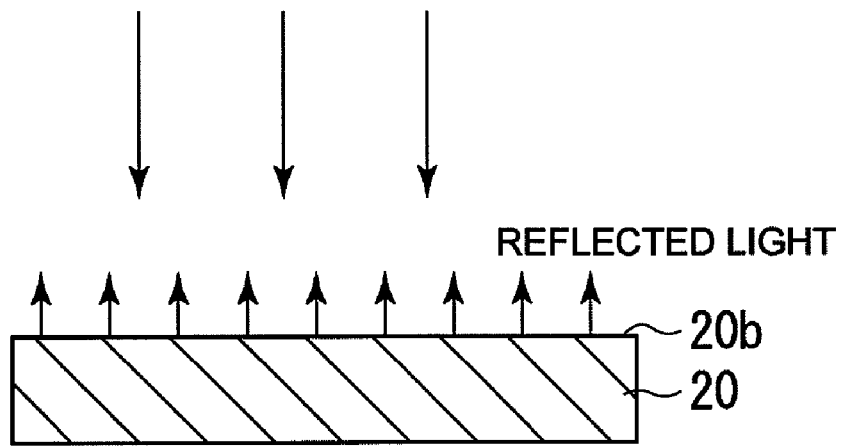

Next, the effect of the front surface roughness of the dark color mask member 20 will be described. FIGS. 6A and 6B show differences in light reflection on the front surface 20b between the case where the front surface 20b of the dark color mask member 20 is rough and the case where the front surface 20b of the dark color mask member 20 is smooth. FIG. 6A shows the case where the front surface 20b is rough (the arithmetic average roughness Ra of the front surface is more than 0.6 μm). Incident light in this case is reflected by the front surface 20b and generates a large amount of scattering light, and the reflected light turns to a whitish color tone. Where the front surface 20b is remarkably rough, a difference in color tone occurs between the region where the dark color mask member 20 having the rough front surface is arranged and the region where the light-emitting display device 22 having a smooth front surface when the light-emitting display device 22 is off, and as a result, the two regions can easily be distinguished, resulting in a poor design. This scattering light gives glare or a feeling of discomfort to a driver especially when the intensity of the incident light is high, which may hinder safe driving. Meanwhile, FIG. 6B shows the case where the front surface 20b is smooth (the arithmetic average roughness Ra of the front surface is no more than 0.6 μm). When the front surface 20b is smooth, the generation of scattering light is suppressed and consequently, the difference in color tone between the region where the dark color mask member 20 having the smooth front surface and the region where the light-emitting display device 22 having a smooth front surface becomes small, and as a result, the two regions cannot easily be distinguished visually, providing a good design. Furthermore, since a smaller amount of scattering light is generated compared to the case where the front surface of the dark color mask member 20 is rough, glare and a feeling of discomfort given to a driver can be reduced, enabling provision of a safer visibility.

The following table shows the results of preparing samples of the dark color mask member 20 made of various resin materials and measuring the arithmetic average roughness Ra of the front surface and the amount of scattering light for each of the samples. In this measurement, the front surface of the arithmetic average roughness Ra was measured using a Keyence laser microscope, and the amount of scattering light was observed visually.

| Dark color mask member sample (resin material) | Front surface roughness Ra (μm) | Amount of scattering light |
| --- | --- | --- |
| Sample 1 (PP) | 0.06 | Small |
| Sample 2 (vinyl chloride) | 0.06 | Small |
| Sample 3 (ABS + PMMA) | 0.07 | Small |
| Sample 4 (PS) | 0.43 | Small |

-continued

| Dark color mask member sample (resin material) | Front surface roughness Ra (μm) | Amount of scattering light |
| --- | --- | --- |
| Sample 5 (PS) | 0.63 | Small |
| Sample 6 (PP) | 0.8 | Large |
| Sample 7 (PS) | 1.27 | Large |
| Sample 8 (PS) | 1.73 | Large |
| Sample 9 (PS) | 2.69 | Large |
| Sample 10 (PS) | 2.92 | Large |
| Sample 11 (PS) | 3.32 | Large |

These measurement results indicate that with an arithmetic average roughness Ra of no more than 0.6 μm (which is a value obtained by rounding off the second decimal place to the first decimal place) for the front surface exhibits only a small amount of scattering light, and thus is most suitable for the front surface of the dark color mask member.

Figure 7A:
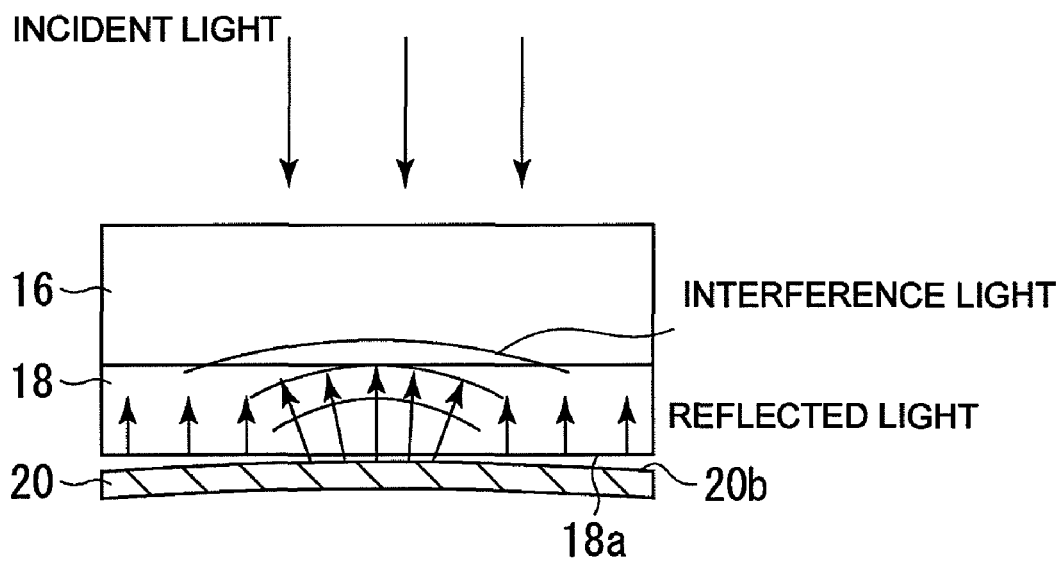
FIGS. 7A and 7B are diagrams indicating a difference in light reflection between the case where no spacer 20c is provided and the case where a spacer 20c is provided.
Figure 7B:
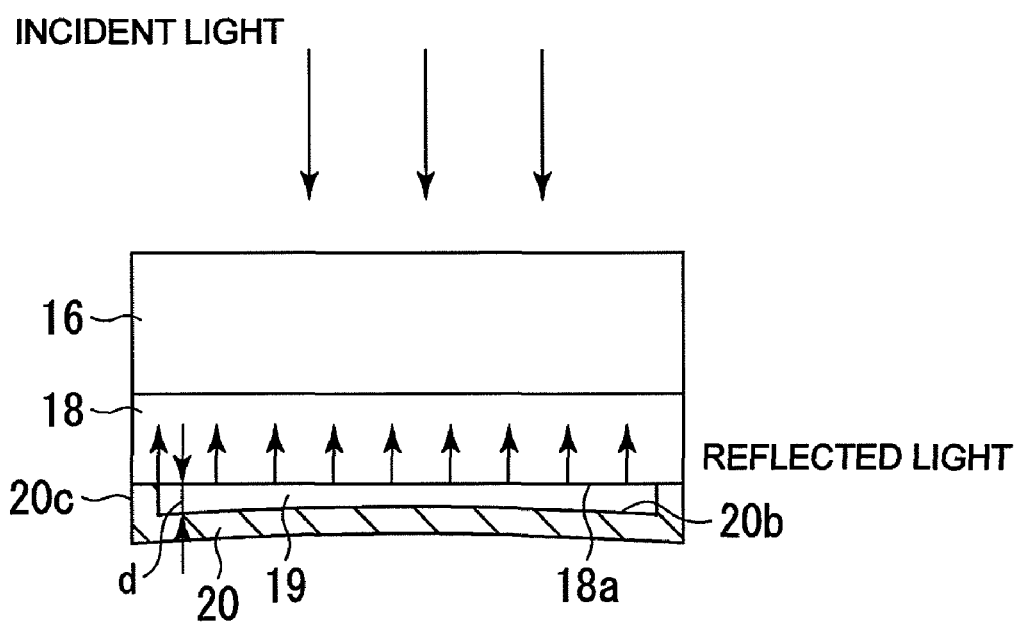

Next, interference light generated between the semi-transmissive reflective film 18 and the dark color mask member 20 will be described. FIGS. 7A and 7B show differences in reflection between the case where no spacer 20c is provided and the case where a spacer 20c is provided. FIG. 7A illustrates the case where no spacer 20c is provided. When the surfaces of the semi-transmissive reflective film 18 and the dark color mask member 20 facing each other come into uneven contact with each other due to a cause, such as an external force being applied to the mirror element 14, or the mirror element 14 and/or the dark color mask member 20 are originally strained, light reflected by the back surface 18a of the semi-transmissive reflective film 18 and light reflected by the front surface 20a of the dark color mask member 20 interfere with each other, generating interference light. Meanwhile FIG. 7B illustrates the case where a spacer 20c is provided. In this case, a clearance gap 19 is formed between the semi-transmissive reflective film 18 and the dark color mask member 20, and consequently, a sufficient distance is provided between the semi-transmissive reflective film 18 and the dark color mask member 20. As a result, light reflected by the back surface 18a of the semi-transmissive reflective film 18 and light reflected by the front surface 20a of the dark color mask member 20 do not interfere with each other, generating no interference light. Where the height d of the spacer 20c is set to no less than 0.3 mm; which is sufficient to avoid the semi-transmissive reflective film 18 and the dark color mask member 20 from coming into contact with each other even if an external force is applied to the mirror element 14, generation of interference light can be prevented. Also, where the height d of the spacer 20c is overly high, the thickness of the housing 12 (FIG. 1B) will be large, and accordingly, it is desirable that the height d of the spacer 20c be no more than 5 mm.

Embodiment 2

Figure 8:
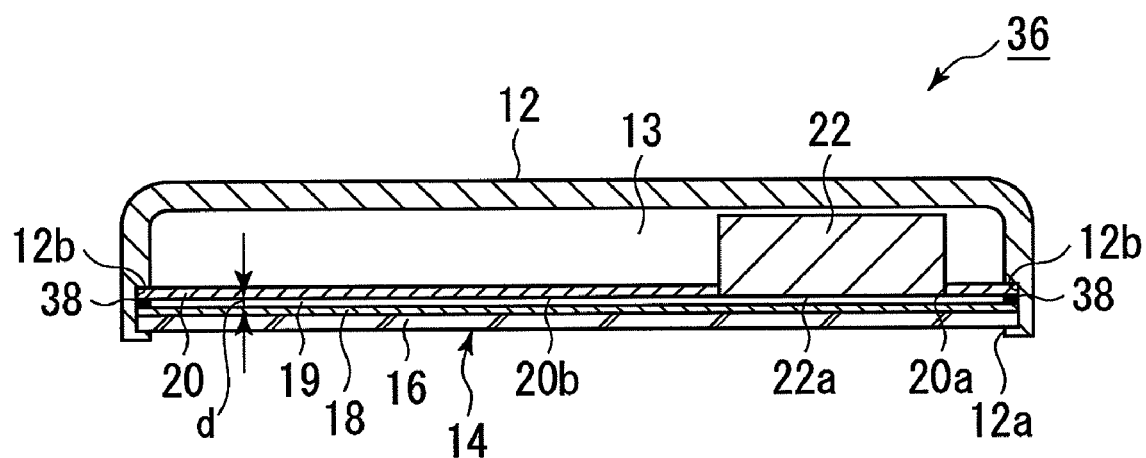
FIG. 8 is a cross-sectional view of a rear-view mirror according to embodiment 2 of the present invention in which a spacer is formed of a member separated from a dark color mask member.

Although in embodiment 1 described above, a spacer is formed of the protrusion 20c integrated with the peripheral edge of the front surface 20b of the dark color mask member 20, a spacer can be formed of a member separated from the dark color mask member 20. FIG. 8 illustrates an embodiment including a spacer formed in such a manner. FIG. 8 is a cross-sectional view taken from a line corresponding to a line indicated by arrows A-A in FIG. 1A. The parts that are in common with those in FIG. 1 are provided with the same reference numerals. An inner mirror 36 has a clearance gap 19 providing a distance d between the mirror element 14 and the dark color mask member 20 by providing a spacer 38 between the entire peripheral edges of the mirror element 14 and the dark color mask member 20. The spacer 38 is formed of, e.g., a ring-shaped, dark color (for example, black) resin member.

Although the above-described embodiments have been described in terms of the case where the present invention is applied to inner mirrors, the present invention can also be applied to outer mirrors or other vehicle rear-view mirrors.

What is claimed is:

1. A light-emitting display device-equipped rear-view mirror comprising:
    a mirror element having a semi-transmissive reflective film attached to one surface of a transparent substrate;
    a dark color mask member having an opening in a surface thereof, the mask member being arranged facing an entire region excluding a region facing the opening or a relevant region excluding the region facing the opening, of a back surface of the mirror element, at least a front surface of the mask member being of a dark color; and
    a spacer arranged between the mirror element and the dark color mask member and providing a clearance gap between the mirror element and the dark color mask member; and
    a light-emitting display device arranged at a position behind the mirror element, with a display surface facing the opening of the dark color mask member, wherein
    a distance provided by the clearance gap between the mirror element and the dark color mask member is set to a distance that prevents interference of light from occurring between light entered from a front surface of the mirror element and reflected by the back surface of the mirror element and light entered from the front surface of the mirror element and reflected by the front surface of the dark color mask member.

2. The light-emitting display device-equipped rear-view mirror according to claim 1, wherein the distance provided by the clearance gap is no less than 0.3 mm and no more than 5 mm.

3. The light-emitting display device-equipped rear-view mirror according to claim 1, wherein the spacer is formed of a protrusion protruding from a peripheral edge of a surface of the dark color mask member facing the mirror element.

4. The light-emitting display device-equipped rear-view mirror according to claim 1, wherein an arithmetic average roughness Ra of the front surface of the dark color mask member facing the mirror element is no more than 0.6 μm.

5. The light-emitting display device-equipped rear-view mirror according to claim 1, wherein the semi-transmissive reflective film is formed of a dielectric multilayer film.

6. The light-emitting display device-equipped rear-view mirror according to claim 1, wherein a reflection peak wavelength in a visible light range of the mirror element is set to from 430 nm to 630 nm.

7. The light-emitting display device-equipped rear-view mirror according to claim 1, wherein a reflection peak wavelength in a visible light range of the mirror element is set to from 500 nm to 550 nm.

* * * * *